(12) United States Patent
Bootz et al.

(10) Patent No.: US 8,006,492 B2
(45) Date of Patent: Aug. 30, 2011

(54) HYDRAULIC STEERING SYSTEM AND METHOD

(75) Inventors: Andreas Bootz, Munich (DE); Torsten Verkoyen, Niederkruechten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 90 days.

(21) Appl. No.: 12/544,664

(22) Filed: Aug. 20, 2009

(65) Prior Publication Data

US 2009/0308062 A1    Dec. 17, 2009

Related U.S. Application Data

(63) Continuation of application No. PCT/EP2008/001453, filed on Feb. 23, 2008.

(30) Foreign Application Priority Data

Feb. 27, 2007  (DE) .......................... 10 2007 009 460

(51) Int. Cl.
*F16D 31/02*        (2006.01)
(52) U.S. Cl. ........................................................ 60/469
(58) Field of Classification Search .................... 60/384, 60/385, 461, 466, 469
See application file for complete search history.

(56) References Cited

U.S. PATENT DOCUMENTS

| | | | |
|---|---|---|---|
| 6,422,126 B1 * | 7/2002 | Hamano et al. | 91/447 |
| 6,467,392 B1 * | 10/2002 | Breuning et al. | 60/469 |
| 7,080,659 B2 * | 7/2006 | Umetani | 137/493.8 |
| 7,574,860 B2 * | 8/2009 | Okabe | 60/469 |
| 2006/0037645 A1 | 2/2006 | Boldt et al. | |

FOREIGN PATENT DOCUMENTS

| | | |
|---|---|---|
| DE | 44 28 081 A1 | 2/1996 |
| DE | 197 29 777 C2 | 2/1999 |
| DE | 100 55 381 A1 | 5/2001 |
| DE | 20 2004 012 963 U9 | 6/2005 |
| DE | 10 2005 051 664 A1 | 5/2007 |
| DE | 10 2006 009 092 A1 | 8/2007 |
| EP | 1 780 099 A1 | 5/2007 |

OTHER PUBLICATIONS

International Search Report dated Jun. 5, 2008 (two (2) pages).
German Search Report dated Dec. 19, 2007 w/English translation of relevant portion (nine (9) pages).

* cited by examiner

*Primary Examiner* — Michael Leslie
(74) *Attorney, Agent, or Firm* — Crowell & Moring LLP

(57) ABSTRACT

A hydraulic steering system has a steering linkage and an actuator actuating the steering linkage. Pressurized hydraulic fluid can be fed to the actuator and removed from the actuator through a return pipe. A device installed into the return pipe counteracts volume flow pulsations by damming up the hydraulic fluid return flow. The device dams up the hydraulic fluid only in the event of an occurrence of a volume flow pulsation.

8 Claims, 1 Drawing Sheet

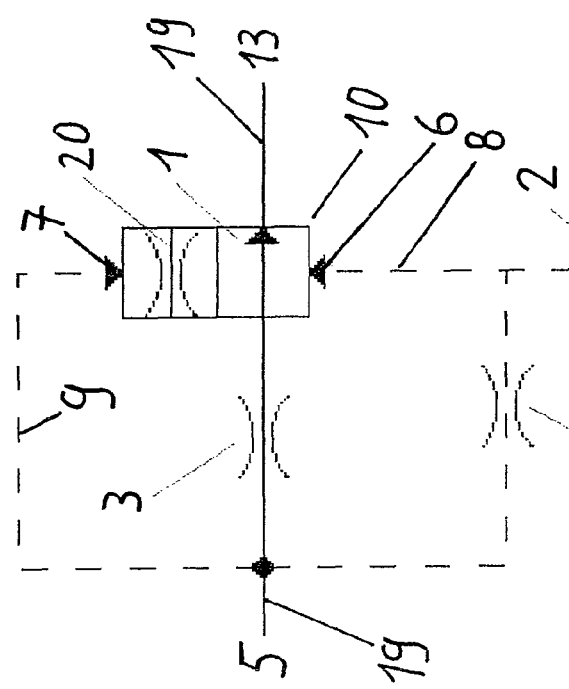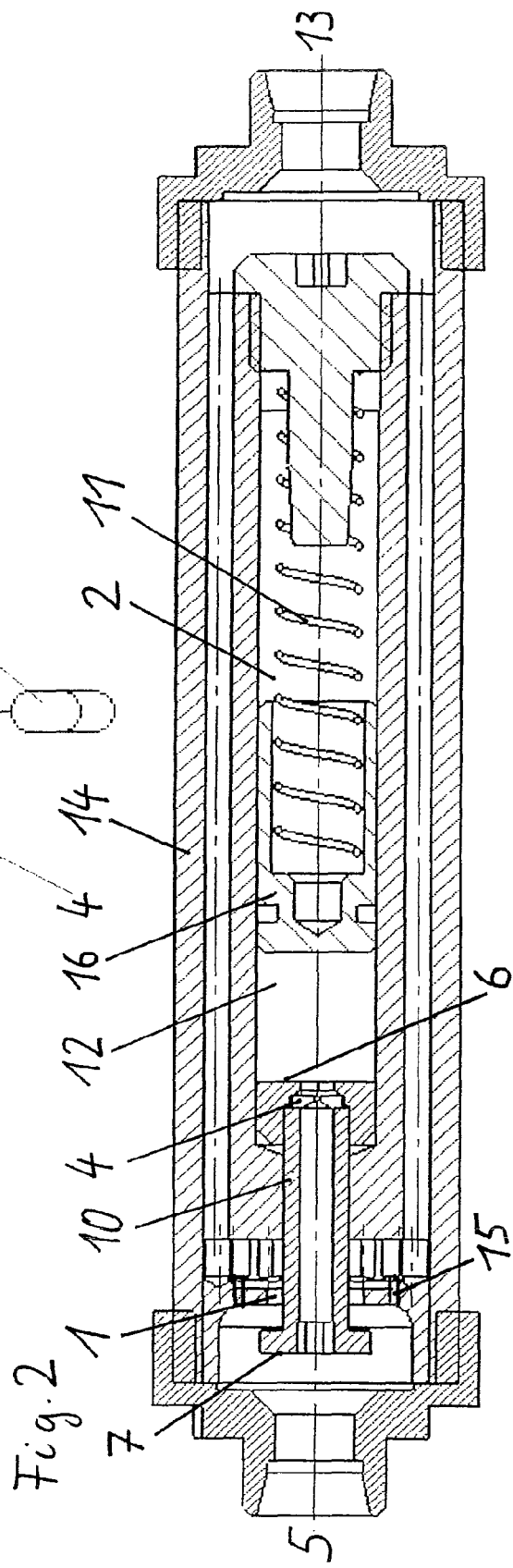

HYDRAULIC STEERING SYSTEM AND METHOD

CROSS-REFERENCE TO RELATED APPLICATIONS

This application is a continuation of PCT International Application No. PCT/EP2008/001453, filed Feb. 23, 2008, which claims priority under 35 U.S.C. §119 to German Patent Application No. DE 10 2007 009 460.6, filed Feb. 27, 2007, the entire disclosures of which are herein expressly incorporated by reference.

BACKGROUND AND SUMMARY OF THE INVENTION

The invention relates to a hydraulic steering system and method having a steering linkage and an actuator actuating the steering linkage. Pressurized hydraulic fluid can be fed to the actuator and removed through a return pipe.

A hydraulic steering system may be constructed as a rack-and-pinion hydro-steering system and may include a pump by which hydraulic fluid can be delivered under pressure to an actuator of the rack-and-pinion hydro-steering system. In this manner, the steering force that has to be applied by the driver of a vehicle can be reduced. By way of an inflow pipe, the pump is connected with the rack-and-pinion hydro-steering system, and a return pipe is also provided by which hydraulic fluid can be delivered back into a storage tank from the rack-and-pinion hydro-steering system.

In the case of such hydraulic open-center steering systems, axle vibrations, which arise when driving over uneven ground in the steered condition, result in excessively fast movements of the rack of a rack-and-pinion hydro-steering system. These movements as well as the load fluctuations connected therewith cause high volume flow rate peaks in the steering system.

In contrast, the pump delivers a constant flow volume into the steering system, so that volume flow rate valleys occur subsequent to the volume flow rate peaks. In the return pipe of the steering system, these volume flow rate valleys result in considerable pressure drops below the ambient pressure. Under certain circumstances, this may have the result that the volume flow breaks off and, because of the mass characteristics of the fluid, a "tensile stress" occurs in the flowing fluid column. Thus, cavitation bubbles, in which hydraulic fluid evaporates, may occur in the return pipe. These cavitation bubbles collapse at a very high speed and, in the process, generate high-frequency pressure peaks. These pressure peaks lead to a structure-borne noise excitation of the components conducting the hydraulic fluid, which is clearly audible in the vehicle and represents an acoustic quality problem.

Depending on the natural frequency of the entire axle kinematics of the steering system, this acoustic phenomenon occurs several times successively with a frequency of approximately 10 to 20 Hz. The individual events therefore follow one another at very short intervals and thereby generate a rattling noise. The driver of the vehicle would feel that such a noise is particularly disturbing.

German patent document DE 197 29 777 C2 describes damping valves for a power steering system constructed as described above. Here, one damping valve, respectively, is situated at the inflow and outflow of the actuator, between the actuator and the steering valve. The two damping valves act reciprocally, each in one flow direction.

In the case of other known steering systems, the noise problem is combated by a damming-up of the return pipe by way of an orifice plate which is arranged in the center or at the end of the return pipe. By way of the orifice plate, an increased pressure is obtained in the return pipe, by which the formation of cavitations is prevented. However, at the same time, an undesirable loss of pressure is caused by which the power consumption of the steering system is increased. The fuel consumption fraction for the steering system will therefore be rising. Furthermore, a higher cooling capacity will be required in extreme driving situations with a high thermal load (for example, during a high-speed drive or an uphill drive).

It is an object of the invention to provide a hydraulic steering system which, while its construction is simple, permits such an exact proportioning of the time response that the mentioned acoustic problems will not occur. In addition, only low energy expenditures should be required for the steering system.

According to the invention, a hydraulic steering system is provided having a steering linkage and an actuator actuating the steering linkage, to which actuator pressurized hydraulic fluid can be fed and from which the hydraulic fluid can be removed through a return pipe. A device is installed in the return pipe which counteracts volume flow pulsations by damming up the hydraulic fluid return flow. This device is constructed such that it dams up the hydraulic fluid only in the event of the occurrence of a volume flow pulsation.

When a flow resistance, which can be varied as a function of pressure, is applied to the discharged hydraulic fluid flow in the return pipe from the actuator to a storage tank, particularly in front of the storage tank and behind the steering valve, this has the advantage that a permanent loss of pressure is avoided while the acoustics are good. The flow resistance is constructed, for example, as a damping valve, which dams up the return flow only in the event of the occurrence of a volume flow pulsation, and thus has a damming effect only as required. The fuel consumption fraction of the steering is reduced.

When a volume flow rate peak in the hydraulic system occurs in the case of a steering system improved in this manner, which volume flow rate peak clearly exceeds the nominal volume flow rate, the return flow will be dammed up according to the invention. As a result, the pressure loss in the return pipe will rise and a damping effect will occur according to the requirement without the occurrence of a continuous damming-up of hydraulic fluid and energy consumption connected therewith.

According to a further embodiment of the invention, the device counteracting volume flow pulsations preferably consists of a hydraulic fluid storage volume, which can be enlarged against a restoring force and which can be filled and emptied by way of a resistance in the valve slide, which acts as a throttle. A valve chamber having a main sectional flow area and a secondary sectional flow area is installed into the return pipe, which valve chamber displaceably carries the valve slide for closing the main sectional flow area. The valve slide has two piston surfaces which respond to the pressure in the hydraulic fluid and are situated opposite one another in the displacement direction, one of the two piston surfaces having a larger effective surface in the storage volume and another having a smaller effective surface in the sectional flow area of the return flow. The piston surfaces are selected such that, on the one hand, when the hydraulic fluid return flow is free of pulsations, the valve slide is held in the valve chamber with an open main sectional flow area and, on the other hand, as a result of the occurrence of volume flow pulsations, is displaced into a position closing the main sectional flow area. Subsequently, the throttle, the secondary sectional flow area and the storage volume loaded by the restoring force together with the valve slide form a passively switched time delay element, which permits the automatic axial displacement of the valve slide into the opening position for the main sectional flow area only when the volume flow pulsations have been damped and/or have subsided.

Based on the mechanically hydraulic method of operation, the device can advantageously be constructed with fewer components and can be integrated in the return pipe without any significant expenditures. Moreover, it can virtually be installed as one component, and no additional components have to be mounted.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic view of a hydraulic connection diagram of a damping valve according to an embodiment of the invention to be installed in the return pipe of a hydraulic steering system; and FIG. 2 is a sectional view of an implemented damping valve according to FIG. 1.

DETAILED DESCRIPTION OF THE DRAWINGS

In the following, an embodiment of a device which counteracts volume flow pulsations will be described.

A damping value is illustrated in the figures, which is provided for a hydraulic steering system according to the state of the art in a motor vehicle, which hydraulic steering system is not shown in detail. The steering system consists, for example, of a steering linkage that can be hydraulically actuated by an actuator as well as a pump providing hydraulic pressure. A steering valve is integrated into the hydraulic steering system, by which a flow of pressurized hydraulic fluid can optionally be switched from the pump to the steering linkage and/or through a return pipe to a storage tank. The damping valve illustrated in the figures is installed into this return pipe.

According to FIG. 1, the damping valve consists of a hydraulically controlled—in this case, openable and closable—main sectional flow area 1, a pressure accumulator 2, an orifice plate 3, which reflects the flow resistance of the main sectional flow area 1 with a secondary sectional flow area (bores 15, FIG. 2) and a resistance in the valve slide 10 acting as a throttle 4. While there is a constant flow through the main sectional flow area 1, the pressure accumulator 2 is connected with the inflow 5 only by way of the throttle 4, which has a smaller cross-section. The valve slide 10 for opening and closing the main sectional flow area 1 is loaded by pressure on both sides, the effective control surfaces 6, 7 of both sides being different which, in the stationary state under identical pressure conditions on both sides, results in a defined position of the valve slide 10, as illustrated in the open state. The larger effective control surface is acted upon by the pressure accumulator 2.

In the event of the occurrence of a volume flow pulsation, the pressure in the inflow 5 of the damping valve will rise because, in the case of an increasing volume flow, the pressure drop by way of the resistance of the orifice plate 3 in the main sectional flow area 1 of flow will rise. The orifice plate 3 outlined here as a throttle is the result of the flow resistance of the main sectional area 1 of flow and of the secondary sectional area 15 of flow (FIG. 2), which have a defined flow resistance in the open condition. However, the pressure in the pressure accumulator 2 cannot rise so fast because the latter first has to charge itself against the high resistance of the throttle 4. The valve slide 10 thereby closes the main sectional area 1 of flow because of the existing pressure difference at the effective control surfaces 6, 7 of the two control lines 8, 9. A constant dam-up pressure will then occur in the inflow 5, which can be varied by way of the secondary sectional area of flow—the bores 15 (FIG. 2). Its flow resistance is illustrated in FIG. 1 by the additional orifice plate 20 now connected into the main sectional area 1 of flow, together with the orifice plate 3.

When, after a certain time period, the pressure in the pressure accumulator 2 reaches approximately the dam-up pressure level of the inflow 5, the valve slide 10 switches back into the outlined starting position because of the different surface conditions of the effective control surfaces 6, 7, which are loaded by the control pressures. At the moment of the opening of the main sectional flow area, even a self-reinforcing effect occurs because the pressure in the inflow 5 falls faster as a result of suitable accumulating and orifice plate characteristics than the pressure in the pressure accumulator 2, and the force which opens the main sectional flow area 1 thereby rises faster with its increasing opening cross-section. When the main sectional flow area 1 is opened up again, the pressure accumulator 2 can discharge again by way of the throttle 4 and thereby also return into its starting condition.

FIG. 2 shows a technical construction of the hydraulic damper valve in the return pipe 19 (FIG. 1) according to an embodiment of the invention. This damper valve consists of a hydraulic fluid storage volume 12—the pressure accumulator 2—which can be increased against a restoring force of a spring 11. The hydraulic fluid storage volume 12 can be filled and emptied by way of the valve slide 10 acting as a throttle 4 as a result of the resistance. A valve chamber 14 having a main 1 and a secondary sectional flow area is installed into the return pipe (not shown in this figure), between the inflow 5 and the outflow 13. The valve chamber 14 displaceably carries the valve slide 10 for closing and opening the main sectional flow area 1. For this purpose, the valve slide 10 has two piston surfaces, which respond to the pressure in the hydraulic fluid and are situated opposite one another in the displacement direction. One of the two piston surfaces has a larger effective control surface 6 in the storage volume 12 and the other having a smaller effective control surface 7 in the sectional flow area of the return flow. The control surfaces 6, 7 are selected such that, on the one hand, when the hydraulic fluid return flow is free of pulsations, the valve slide 10 is held in the valve chamber 14 with an open main sectional flow area 1 and, on the other hand, as a result of the occurrence of volume flow pulsations, is displaced into a position closing the main sectional flow area 1. Subsequently, the throttle 4, the secondary sectional flow area and the storage volume 12 loaded by the restoring force of the spring 11 together with the valve slide 10 form a passive switching time delay element, which permits the automatic axial displacement of the valve slide 10 into the opening position for the main sectional flow area 1 only when the volume flow pulsations have been damped and/or have subsided.

In the case of a stationary volume flow, the main sectional flow area 1 is in the opened position; the pressure accumulator 2 is under the pressure that exists in front of the main sectional flow area 1 in the inflow 5 of the damping valve. Since the control surface 6 of the piston of the valve slide 10 acted upon by the pressure accumulator 2 is larger than that placed on the opposite side in the inflow 5, the valve slide 10, when the pressures are identical on both sides, is pressed toward the left, thus into the open position for the main 1 and secondary sectional area of flow. When a volume flow pulsation occurs, the pressure in the inflow 5 will rise because, at this moment, more volume flow has to flow via the main sectional flow area 1, which causes a greater pressure drop at the main sectional flow area 1. Since, in the case of a displacement of the spring-loaded pressure accumulator piston 16 by only a few millimeters, the pressure in the pressure accumulator 2 does not rise significantly, and no large volume flow can flow by way of the secondary sectional flow area, constructed as bores 15 in the valve seat of the valve slide 10, a condition occurs in which a higher pressure is present in the inflow 5 than in the pressure accumulator 2, whereby, despite the differently sized control surfaces 6, 7, the valve slide 10 is displaced toward the right and closes the main sectional flow area 1. This effect is further intensified by flow forces at the valve slide 10.

When the main sectional flow area 1 is closed, the hydraulic fluid can only still flow off by way of the secondary sectional area of flow,—the bores 15 in the valve face of the valve slide 10. As a result, a higher pressure than previously will occur in the inflow 5. This dam-up pressure has the result that a portion of the hydraulic fluid flows through the throttle 4 in the valve slide 10 into the storage volume 12 and gradually increases the pressure in the pressure accumulator 2, which displaces the storage piston 16 as a result of the enlargement of the storage volume 12.

When the pressure in the pressure accumulator 2 now reaches approximately the same level as in the inflow 5, the force relationships will again be as in the stationary condition, when the main sectional flow area 1 is open. The latter therefore opens up again by displacing the valve slide 10 as a result of the differently sized control surfaces 6, 7. The opening of the main sectional flow area 1 leads to a lowering of the dam-up pressure level. Simultaneously, the closing force at the valve face is also minimized while the force opening the valve slide 10 decreases only slightly because the pressure is maintained longer in the pressure accumulator 2 as a result of the high resistance of the throttle 4. This has the important advantage that the valve slide 10 does not start to vibrate but moves directly into the open position. Subsequently, the pressure accumulator 2 can be discharged again by way of the throttle 4 until the same pressure occurs as in the inflow 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hydraulic steering system having a steering linkage and an actuator actuating the steering linkage, the hydraulic steering system comprising:
   a return pipe through which pressurized hydraulic fluid fed to the actuator is removable from the actuator; and
   a hydraulic fluid return flow damming device arranged in the return pipe, the hydraulic fluid return flow damming device counteracting volume flow pulsations by damming-up the hydraulic fluid only when a volume flow pulsation occurs,
   wherein the hydraulic fluid return flow damming device comprises a hydraulic fluid storage volume that accumulates the hydraulic fluid when the volume flow pulsation occurs.

2. The hydraulic steering system according to claim 1, wherein the hydraulic fluid storage volume is enlargeable against a restoring force and fillable and emptiable by way of a resistance in a valve slide, which valve slide functions as a throttle;
   wherein the hydraulic fluid return flow damming device further comprise a valve chamber having a main sectional flow area and a secondary sectional flow area, the valve chamber being arranged in the return pipe and displaceably carrying the valve slide for closing the main sectional flow area;
   wherein the valve slide has two piston surfaces which respond to pressure in the hydraulic fluid, the two piston surfaces being situated opposite one another in a displacement direction, one of the two piston surfaces having a larger effective surface in the hydraulic fluid storage volume and the other piston surface having a smaller effective surface in the sectional flow area of a return flow; and
   wherein the piston surfaces are selected such that (i) when the hydraulic fluid return flow is free of pulsations, the valve slide is held in the valve chamber with an open main sectional flow area and (ii) when a volume flow pulsation occurs, the valve slide is displaced into a position closing the main sectional flow area and, subsequently, the throttle, the secondary sectional flow area and the storage volume loaded by the restoring force together with the valve slide form a passively switched time delay element permitting automatic axial displacement of the valve slide into the opening position for the main sectional flow area only when the volume flow pulsations are damped.

3. The hydraulic steering system according to claim 2, wherein the storage volume is accommodated in the valve chamber.

4. The hydraulic steering system according to claim 1, wherein the hydraulic fluid storage volume is enlargeable against a restoring force.

5. The hydraulic steering system according to claim 4, wherein the hydraulic fluid storage volume is fillable and emptiable by way of a resistance in a valve slide, which valve slide functions as a throttle.

6. The hydraulic steering system according to claim 4, wherein the hydraulic fluid storage volume acts on a surface of a valve slide.

7. A method of operating a hydraulic steering system having a steering linkage and an actuator that actuates the steering linkage, the method comprising the acts of:
   feeding pressurized hydraulic fluid to the actuator;
   removing the hydraulic fluid from the actuator through a return pipe; and
   only when a volume flow pulsation occurs, damming-up a return flow of the hydraulic fluid in the return pipe,
   wherein a hydraulic fluid storage volume accumulates the hydraulic fluid when the volume flow pulsation occurs.

8. The method according to claim 7, wherein the act of damming-up is carried out by:
   the hydraulic fluid storage volume that is enlargeable against a restoring force and fillable and emptiable by way of a resistance in a valve slide, which valve slide functions as a throttle;
   a valve chamber having a main sectional flow area and a secondary sectional flow area, the valve chamber being arranged in the return pipe and displaceably carrying the valve slide for closing the main sectional flow area;
   wherein the valve slide has two piston surfaces which respond to pressure in the hydraulic fluid, the two piston surfaces being situated opposite one another in a displacement direction, one of the two piston surfaces having a larger effective surface in the hydraulic fluid storage volume and the other piston surface having a smaller effective surface in the sectional flow area of a return flow; and wherein the piston surfaces are selected such that (i) when the hydraulic fluid return flow is free of pulsations, the valve slide is held in the valve chamber with an open main sectional flow area and (ii) when a volume flow pulsation occurs, the valve slide is displaced into a position closing the main sectional flow area and, subsequently, the throttle, the secondary sectional flow area and the storage volume loaded by the restoring force together with the valve slide form a passively switched time delay element permitting automatic axial displacement of the valve slide into the opening position for the main sectional flow area only when the volume flow pulsations are damped.

* * * * *